(12) United States Patent
Fujita et al.

(10) Patent No.: US 8,854,723 B2
(45) Date of Patent: Oct. 7, 2014

(54) DISPLAY MEDIUM AND DISPLAY DEVICE (75) Inventors: Mamoru Fujita, Kanagawa (JP); Hideo Kobayashi, Kanagawa (JP); Masaaki Lawrence Araki, Kanagawa (JP); Takehito Hikichi, Kanagawa (JP); Motohiko Sakamaki, Kanagawa (JP); Akihide Kawamura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 15 days.

(21) Appl. No.: 13/611,896

(22) Filed: Sep. 12, 2012

(65) Prior Publication Data

US 2013/0242375 A1  Sep. 19, 2013

(30) Foreign Application Priority Data

Mar. 16, 2012  (JP) ................................. 2012-061120

(51) Int. Cl.
G02B 26/00 (2006.01)
(52) U.S. Cl.
USPC ........................................................ 359/296
(58) Field of Classification Search
USPC .......................................... 359/296; 345/107
See application file for complete search history.

(56) References Cited

U.S. PATENT DOCUMENTS

| | | | | |
|---|---|---|---|---|
| 6,850,357 | B2 * | 2/2005 | Kaneko et al. | 359/296 |
| 8,400,705 | B2 * | 3/2013 | Murakami | 359/296 |
| 2006/0103789 | A1 | 5/2006 | Takahashi et al. | |

FOREIGN PATENT DOCUMENTS

| | | |
|---|---|---|
| JP | A-04-237027 | 8/1992 |
| JP | A-2003-280051 | 10/2003 |
| JP | A-2006-145602 | 6/2006 |

* cited by examiner

Primary Examiner — Tuyen Tra
(74) Attorney, Agent, or Firm — Oliff PLC (57) ABSTRACT

A display medium includes a first substrate that is transparent to light, a second substrate, a spacing member, and a particle dispersion liquid. The second substrate is provided to be opposite to the first substrate and has a plurality of electrodes placed at a predetermined interval. The spacing member (i) is placed between the first and second substrates at another interval different from the predetermined interval of the electrodes, (ii) has a first end portion on a first substrate side of the spacing member and a second end portion on a second substrate side of the spacing member. The first end portion is transparent to light. The second end portion has different transparency from the first end portion to reduces a reflection of light incident through the first substrate onto a first substrate side of the spacing member.

9 Claims, 10 Drawing Sheets

DISPLAY MEDIUM AND DISPLAY DEVICE

CROSS-REFERENCE TO RELATED APPLICATION

This application is based on and claims priority under 35 USC119 from Japanese Patent Application No. 2012-061120 filed on Mar. 16, 2012.

BACKGROUND

Technical Field

The present invention relates to a display medium and a display device.

SUMMARY

According to an aspect of the invention, a display medium includes a first substrate that is transparent to light, a second substrate, a spacing member, and a particle dispersion liquid. The second substrate is provided to be opposite to the first substrate and has a plurality of electrodes placed at a predetermined interval. The spacing member (i) is placed between the first and second substrates at another interval different from the predetermined interval of the electrodes, (ii) has a first end portion on a first substrate side of the spacing member and a second end portion on a second substrate side of the spacing member. The first end portion is transparent to light. The second end portion has different transparency from the first end portion to reduces a reflection of light incident through the first substrate onto a first substrate side of the spacing member. The particle dispersion liquid is filled between the first and second substrates, and includes particles which are moved by an electric field formed between the first and second substrates and a dispersion medium.

BRIEF DESCRIPTION OF THE DRAWINGS

Exemplary embodiments of the invention will be described in detail based on the following figures, wherein.

DETAILED DESCRIPTION

<First Exemplary Embodiment>

Examples of a display medium and a display device according to a first exemplary embodiment of the present invention will be described with reference to FIGS. 1 to 7.

(Display Device)

First, a configuration of a display device 10 will be described. The display device 10 is used as, for example, a device capable of storing and rewriting an image (specifically, a bulletin board, a notification board, an electronic blackboard, an advertisement, a signboard, a blinking sign, an electronic paper, an electronic newspaper, an electronic book, and a document sheet which can be shared with a copy machine and a printer).

Figure 3:
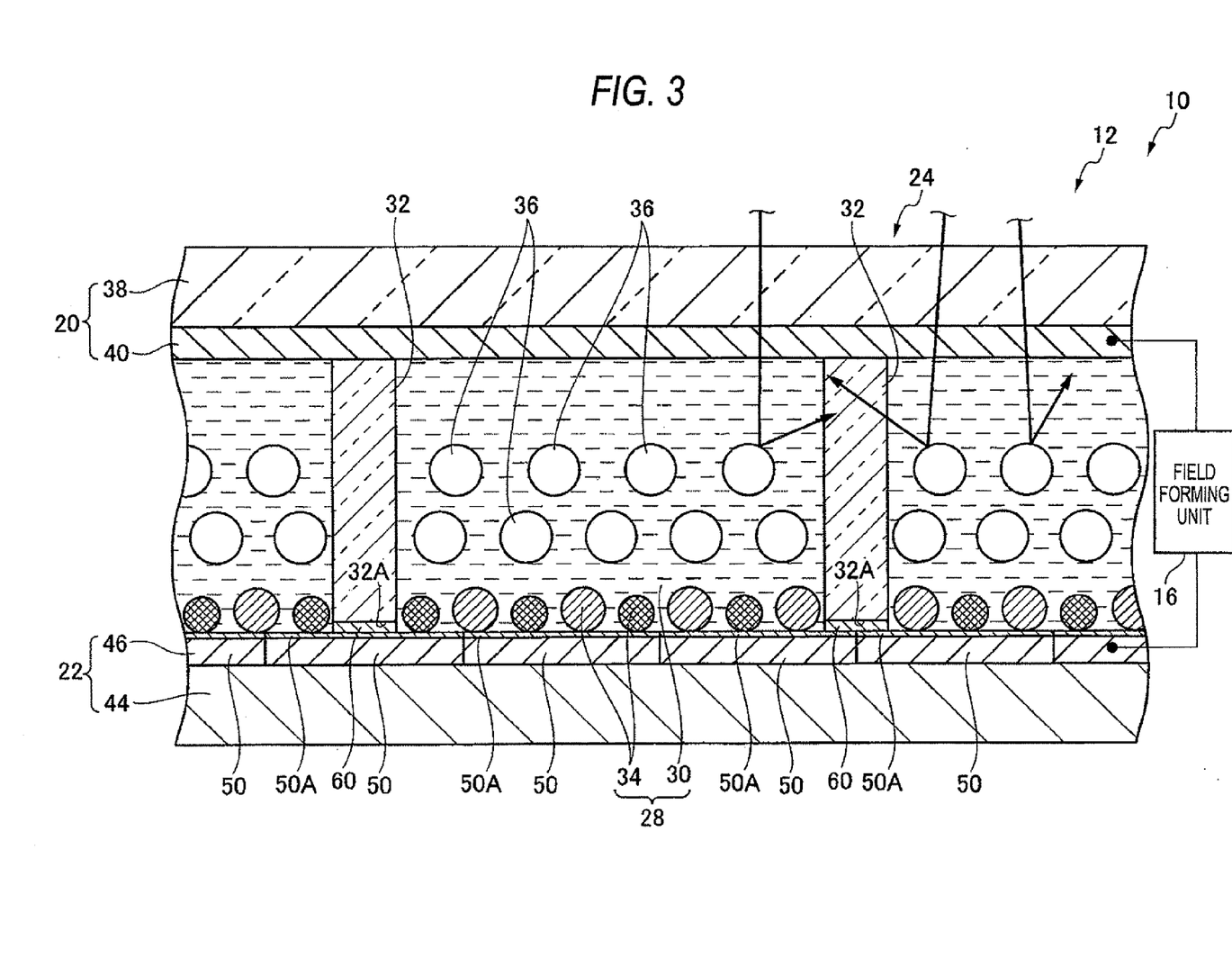
FIG. 3 is a cross-sectional view illustrating a display device and the display medium according to the first exemplary embodiment.
Figure 4:
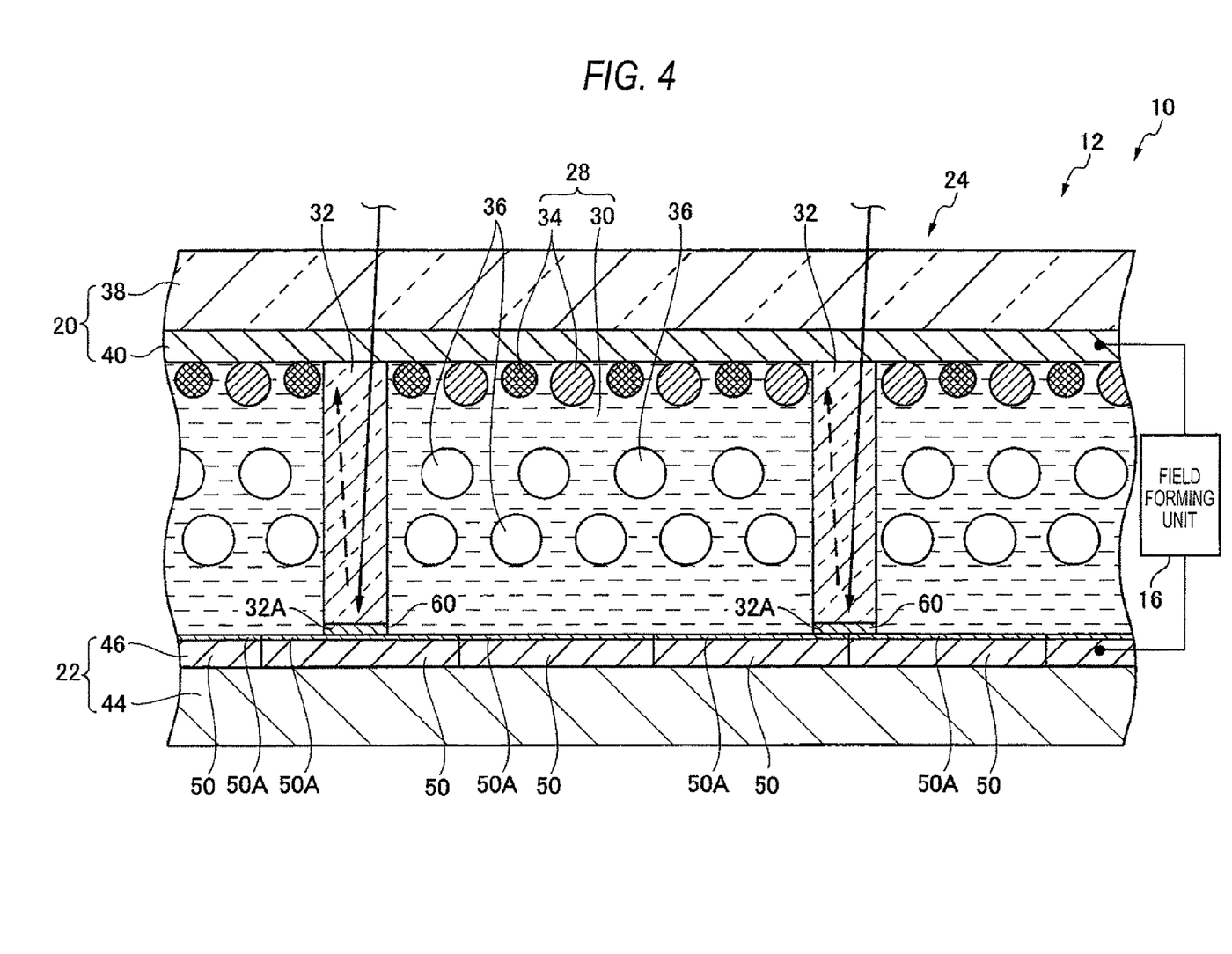
FIG. 4 is a cross-sectional view illustrating the display device and the display medium according to the first exemplary embodiment.

As illustrated in FIGS. 3 and 4, the display device 10 electrophoretically displays an image, and includes a display medium 12 used to display the image and a field forming unit 16 applying voltage to the display medium 12 and forming an electric field in the display medium 12.

The field forming unit 16 is electrically connected to a surface electrode 40 and a back electrode 46 to be described below, which are provided in the display medium 12. Voltage is applied between the surface electrode 40 and the back electrode 46 by the field forming unit 16, such that the electric field is formed between the surface electrode 40 (a surface substrate 20) and the back electrode 46 (a back substrate 22).

(Display Medium)

Figure 7:
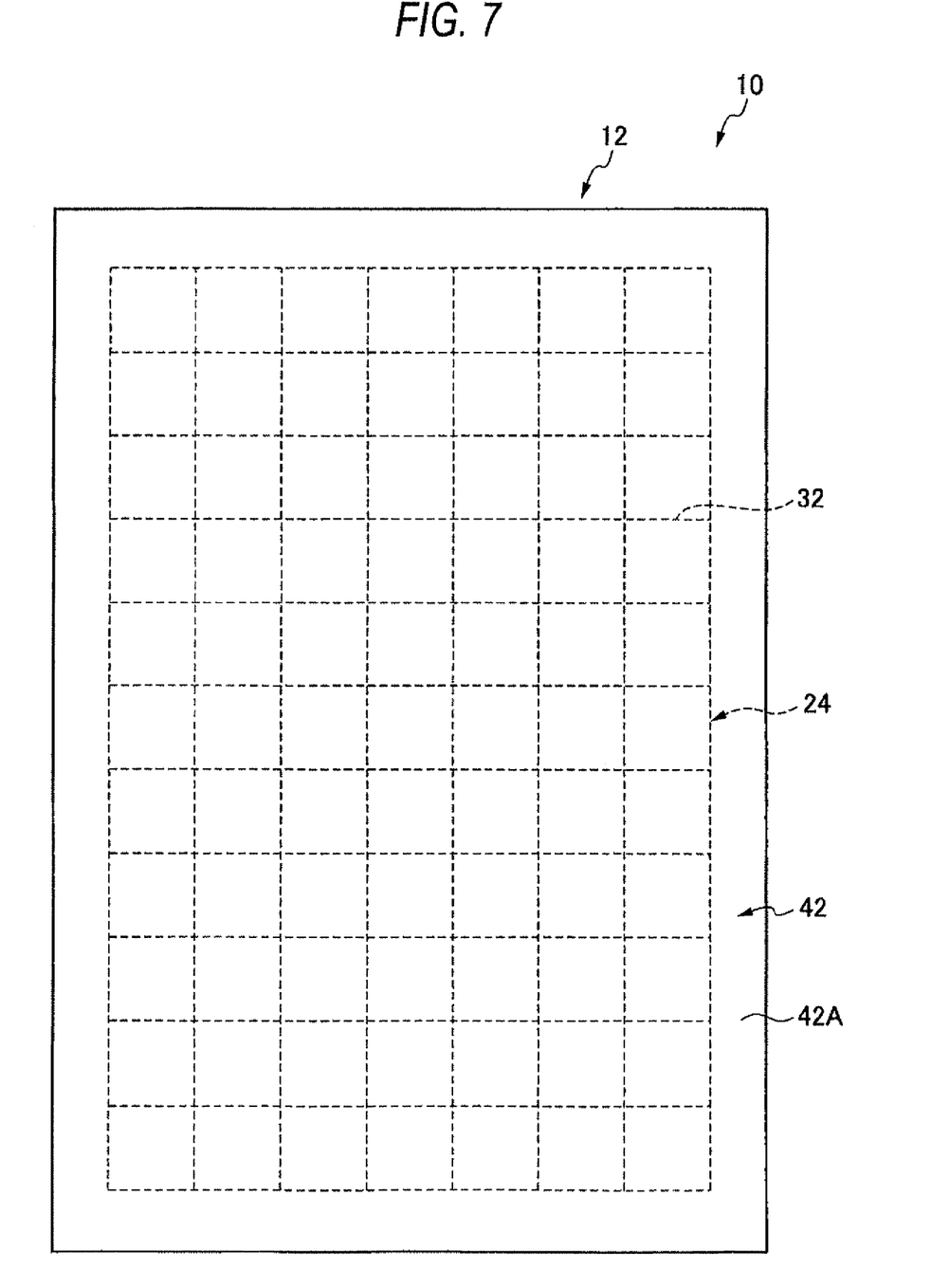
FIG. 7 is a plan view illustrating the display medium according to the first exemplary embodiment.

As illustrated in FIG. 7, the display medium 12 includes a display unit 24 displaying an image and a bonding unit 42 bonding the surface substrate 20 as an example of a first substrate and the back substrate 22 as an example of a second substrate (see FIGS. 3 and 4) to be described below.

[Bonding Unit]

The bonding unit 42 is placed to surround the outer periphery of the display unit 24 and is configured by a bonding member 42A bonding the surface substrate 20 and the back substrate 22. The bonding unit 42 may be omitted by forming a bonding member X on an opposed surface 32A of a spacing member. As for the bonding member X, a sticking agent or an adhesive agent that may ensure sufficient adhesiveness without deteriorating a display property needs to be selected, and a selectable material of the bonding member X is limited as compared with the bonding member 42A, but a particle dispersion liquid may be substantially prevented from passing between areas (hereinafter, referred to as 'cells') partitioned by the spacing member.

[Display Unit]

[Surface Substrate and Back Substrate]

Figure 6:
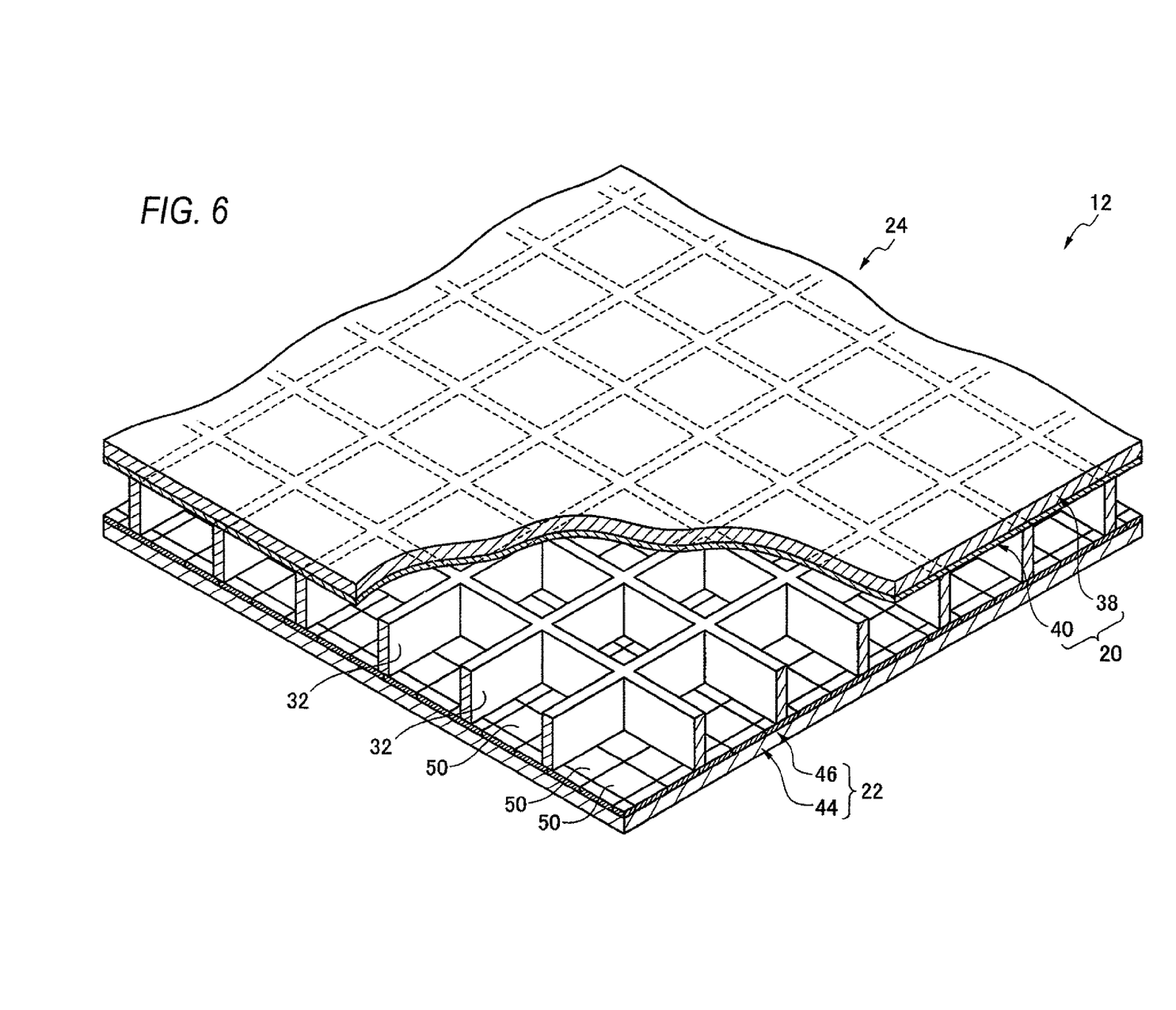
FIG. 6 is a perspective view illustrating the display medium according to the first exemplary embodiment.

FIGS. 3 and 4 illustrate a cross section of the display unit 24 and FIG. 6 is a perspective view of the display unit 24 of which a coating 60 to be described below is not illustrated.

As illustrated in FIGS. 3, 4, and 6, the display unit 24 includes the surface substrate 20 serving as a surface where an image is displayed and the back substrate 22 placed to be opposite to the surface substrate 20 which is separated with a gap.

The surface substrate 20 includes a support substrate 38 and the surface electrode 40 placed on the back substrate 22 side of the support substrate 38. The back substrate 22 includes a support substrate 44 and the back electrode 46 placed on the surface substrate 20 side of the support substrate 44.

The transmittance of at least the surface substrate 20 among the surface substrate 20 and the back substrate 22, is 60% or more.

As for the support substrates 38 and 44, for example, glass, plastic, a polyethylene terephthalate resin, a polyethylene naphthalate resin, a polycarbonate resin, an acrylic resin, a polyimide resin, a polyester resin, an epoxy resin, a polyether sulfone resin, and the like are used.

Materials of the surface electrode 40 include, for example, oxides such as indium oxide, tin oxide, cadmium oxide, antimony oxide and the like, complex oxides such as ITO and the like, metals such as gold, silver, copper, nickel and the like, and organic materials such as polypyrrole, polythiophene and the like. These materials are used as, for example, a single layer film, a mixed film or a complex film. These materials are formed by, for example, a deposition method, a sputtering method, a coating method, a chemical vapor deposition (CVD) method, and the like.

As for the back electrode 46, for example, a plurality of electrodes having a single layer or multilayer structure are used, such as a driving circuit such as a transistor (thin film transistor (TFT)) and a diode. The back substrate will be described in detail below.

[Spacing Member]

A spacing member 32 that partitions a space between the surface substrate 20 and the back substrate 22 into a plurality of portions and, at the same time, keeps a gap between the substrates, is provided in a lattice pattern between the substrates. The intervals between the lattices are formed in a regular distance.

A cross section of the spacing member 32 that has been cut perpendicularly to the surface direction of the surface substrate 20 has a rectangular shape. One end (the upper part of the figure) of the spacing member 32 contacts the surface electrode 40, and the coating 60 is formed on the other end (the lower part of the figure) of the spacing member 32, and the other end of the spacing member 32 contacts the back electrode 46 through the coating 60. The spacing member 32 may be colorless and transparent so as not to have a bad influence on a display image displayed in the display medium 12, and transmittance of the spacing member 32, is 50% or more.

The coating 60 will be described in detail below.

An area (hereinafter, referred to as a cell) partitioned by the spacing member 32 is configured to be surrounded by the surface substrate 20, the back substrate 22 and the spacing member 32. The height (a distance between the electrodes) of the spacing member 32 is in the range of 10 μm to 200 μm (preferably, 50 μm) in consideration of an image quality of the display image and a switching speed of the image. An interval of the spacing member 32 is in the range of 200 μm to 500 μm in consideration of prevention of deterioration in an aperture ratio or prevention of biasing by sedimentation of phoretic particles.

As for the spacing member 32, a thermoplastic resin, a thermosetting resin, an electron beam curable resin, a photo-curable resin, rubber, metal, and the like are used.

A forming method of the spacing member 32 may adopt, for example, a forming method of forming a layer made of a photosensitive resin (for example, the thermoplastic resin: the acrylic resin, acrylate, urethane and the like) having adhesiveness on one side of the surface substrate 20 and the back substrate 22, forming a latent image on the layer of the corresponding resin by exposing the formed layer with a photo-lithography method and developing the latent image. The spacing member 32 may be fanned by embossing a resin by thermal nano imprint, optical nano imprint or nano imprint as a combination thereof. The spacing member 32 may be formed using other known methods.

[Migratory Particle, Dispersion Medium and Reflection Particle]

As illustrated in FIGS. 3 and 4, a particle dispersion liquid 28 containing a plurality of migratory particles 34 moving in the direction of the electric field and a dispersion medium 30, in which the migratory particles 34 are dispersed, is encapsulated in each cell. A plurality of reflection particles 36 having an optical reflection characteristic are dispersed in the dispersion medium 30.

An insulating liquid may be used as the dispersion medium 30. Herein, the "insulating" indicates that a volume resistance value is $10^7$ Ω·cm or more.

Specifically, as the insulating liquid, for example, hexane, cyclohexane, toluene, xylene, decane, hexadecane, kerosene, paraffin, iso-paraffin, silicone oil, modified silicone oil, dichloroethylene, trichloroethylene, perchloroethylene, pure petroleum, ethylene glycol, alcohols, ethers, esters, dimethyl formamide, dimethyl acetamide, dimethyl sulfoxide, N-methylpyrrolidone, 2-pyrrolidone, N-methylformamide, acetonitrile, tetrahydrofuran, propylene carbonate, ethylene carbonate, benzine, diisopropylnaphthalene, olive oil, isopropanol, trichlorotrifluoroethane, tetrachloroethane, dibromotetrafluoroethane and the like or mixtures thereof are appropriately used.

Water (so called, deionized water) without impurities may be used as the dispersion medium 30 to have a volume resistance value described below. The volume resistance value is preferably $10^7$ Ω·cm or more, more preferably in the range of $10^7$ Ω·cm to $10^{19}$ Ω·cm and more preferably in the range of $10^{10}$ Ω·cm to $10^{19}$ Ω·cm. By setting the volume resistance value in the ranges, the electric field is more effectively applied to the particle dispersion liquid 28, and bubbles are prevented from being generated by electrolysis of the dispersion medium 30 caused by an electrode reaction.

Acid, alkali, salt, a dispersion stabilizer, a stabilizer for antioxidation or ultraviolet absorption, an antibacterial agent, a preservative, and the like may be added to the insulating liquid as necessary, but preferably added so that the insulating liquid is in the predetermined volume resistance value ranges described above.

As for an electrification control agent, an anion surfactant, a cationic surfactant, an ampholytic surfactant, a non-ionic surfactant, a fluorinated surfactant, a silicone surfactant, a metallic soap, alkylphosphate esters, succinimides and the like may be added to the insulating liquid.

A polymer resin may be used as the dispersion medium 30. The polymer resin may be a polymer gel, a high-molecular polymer and the like. Specifically, as the polymer resin, for example, gelatin, polyvinyl alcohol, poly(meta)acrylamide and the like are used. The polymer resins may be used as the dispersion medium 30 like the insulating liquid as described above.

The migratory particles 34 are constituted by, for example, two various kinds of large and small colored particles and move between the surface substrate 20 and the back substrate 22 according to the direction of the electric field formed in the cell. Two various kinds of large and small colored particles are described in detail in the present exemplary embodiment, but when a charge amount is controllable, a plurality of kinds of particles may be used, particles having the same shape may be used, or a combination thereof may be used.

As for the migratory particles 34, insulating metallic oxide particles such as glass beads, alumina, titanium oxide and the like, thermoplastic or thermosetting resin particles, particles generated by fixing a colorant onto the surface of the resin particles, particles in which an insulating colorant is contained in the thermoplastic or thermosetting resin, and metallic colloid particles having a Plasmon color producing function are used.

An electrification control agent controlling an electrification property may be mixed within the resin constituting the migratory particles 34 as necessary. A magnetic material may be mixed with an inner part or the surface of the migratory particle 34 as necessary. An external additive may be attached to the surface of the migratory particle 34 as necessary.

The reflection particles 36 encapsulated in each cell are placed at the center portion between the surface substrate 20 and the back substrate 22 regardless of the direction of the electric field between the substrates, and provided throughout the entire surface of the surface substrate 20 in the surface direction.

The reflection particles 36 have an optical reflection characteristic different from the migratory particles 34 and scatter incident light. The migratory particles 34 may pass between the reflection particles 36.

Herein, the "reflection particles 36 have an optical reflection characteristic different from the migratory particles 34" indicates that there is a difference enough to identify a difference therebetween in chromaticity, luminosity and chroma, when the dispersion medium 30 in which only the migratory particles 34 are dispersed is observed with eyes in comparison with the reflection particles 36. In particular, the chromaticity may be different among the chromaticity, luminosity, and chroma thereof.

The "identifiable difference" indicates, for example, that a difference between a* and b* is 5 or more, specifically, at the time of measuring respective CIELAB values in the dispersion medium 30 in which only the migratory particles 34 are dispersed and measuring the reflection particle 36 using X-Rite404 manufactured by X-Rite, Inc., for example, when chroma is different.

According to a configuration of the display unit 24 in the present exemplary embodiment, when voltage is applied to the surface electrode 40 and the back electrode 46 of the display medium 12 from the field forming unit 16, the electric field depending on the applied voltage is formed in the dispersion medium 30. The migratory particles 34 move between the surface substrate 20 and the back substrate 22 by the formed electric field.

For example, when the migratory particles 34 are charged to a negative electrode, positive voltage is applied to the surface electrode 40, and negative voltage is applied to the back electrode 46, the migratory particles 34 move from the back substrate 22 side to the surface substrate 20 side through gaps of the reflection particles 36 (see FIG. 4). In this case, when the display medium 12 is observed from the surface substrate 20 side with eyes, a particulate color of the migratory particle 34 positioned on the surface substrate 20 side is viewed as a color of the display medium 12 (black as one example in the present exemplary embodiment).

Meanwhile, when the negative voltage is applied to the surface electrode 40, and the positive voltage is applied to the back electrode 46, the migratory particles 34 move from the surface substrate 20 side to the back substrate 22 side through the gaps of the reflection particles 36 (see FIG. 3). In this case, when the display medium 12 is observed from the surface substrate 20 side with eyes, a color of the reflection particles 36 is viewed as the color of the display medium 12 (white as one example in the present exemplary embodiment).

(Configurations of Primary Components)

Next, the back substrate 22 and the coating 60 will be described.

Figure 1:
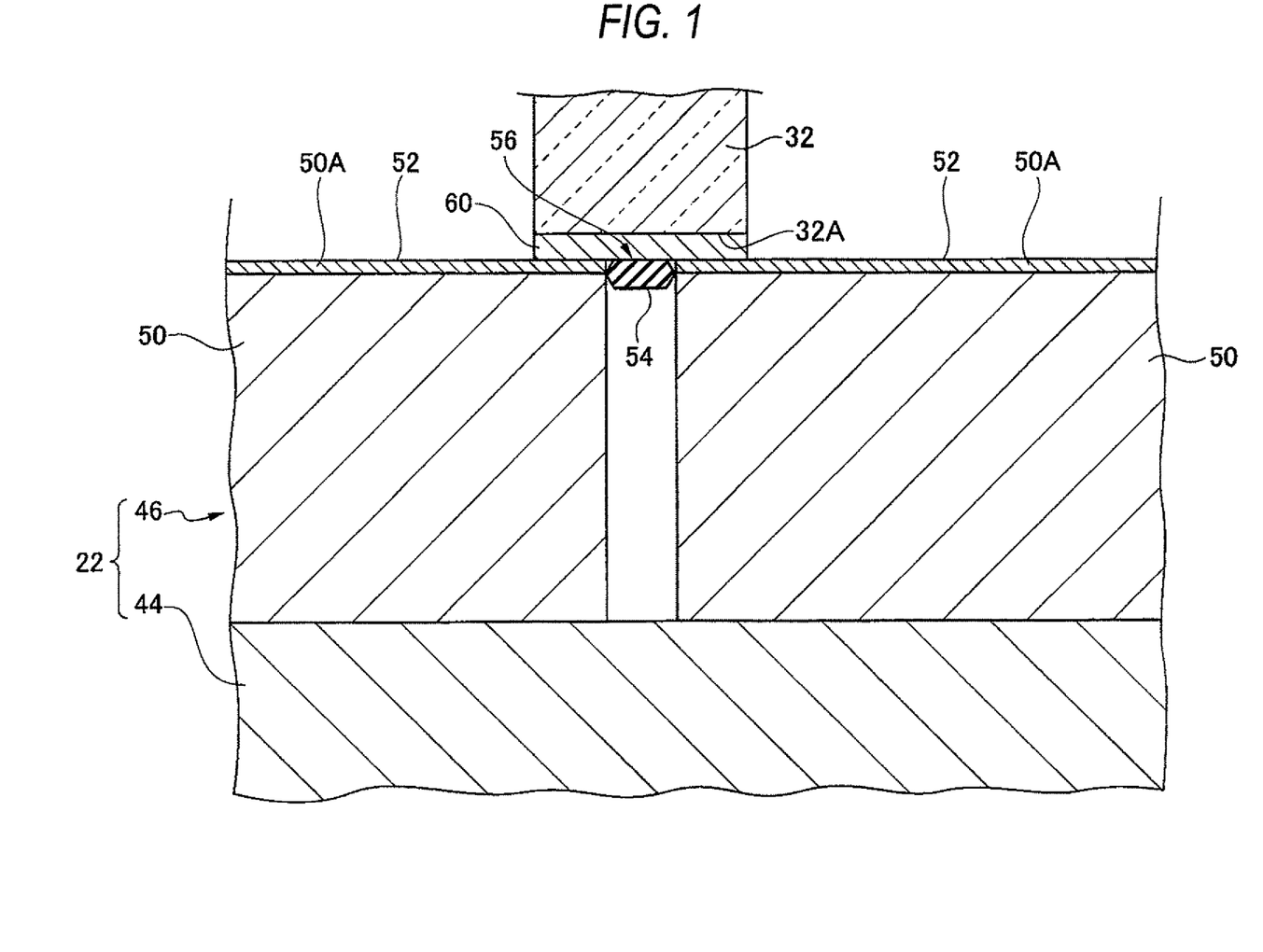
FIG. 1 is a cross-sectional view illustrating a back substrate used in a display medium according to a first exemplary embodiment of the present invention.
Figure 5:
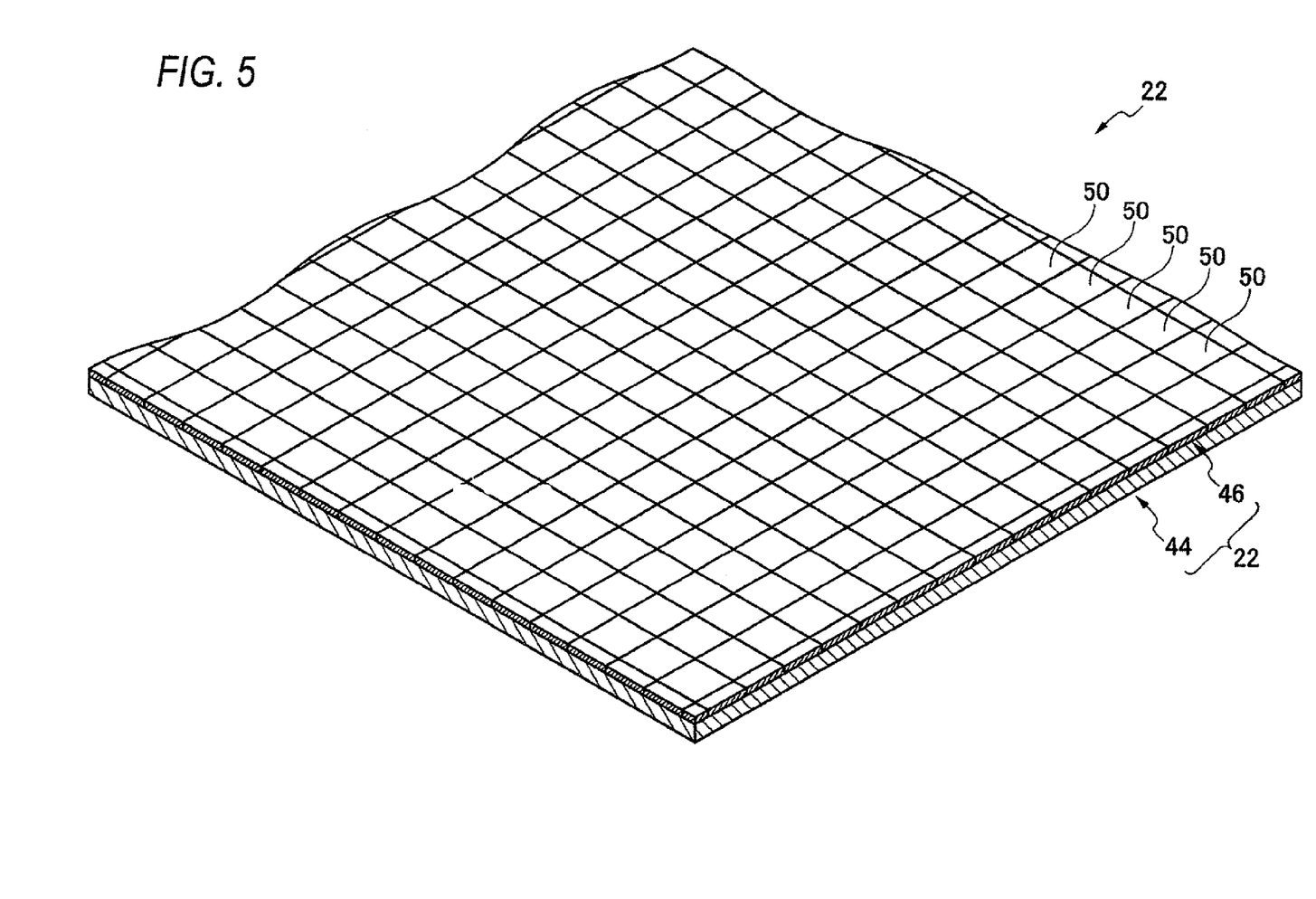
FIG. 5 is a perspective view illustrating the back substrate used in the display medium according to the first exemplary embodiment.

FIG. 5 is a perspective view of the back substrate 22, and FIG. 1 is an enlarged cross-sectional view of the back electrode 46.

As illustrated in FIG. 5, the back electrode 46 constituting the back substrate 22 is configured to include a plurality of individual electrodes 50 as one example of electrodes placed (arranged) longitudinally and laterally at a predetermined interval. Specifically, the individual electrodes 50 have the rectangular shape in planar view when the individual electrodes 50 are viewed perpendicularly to the surface direction of the surface substrate 20, and for example, thin-film transistors (TFTs) of 200 ppi are arranged in parallel at an interval of 127 μm. When the spacing member 32 is set to integral multiple of the interval of the individual electrode 50, a Moire pattern to be described below is not generated, but precise control is difficult by a skew when the substrate is extended and bonded. Both of the spacing member 32 and the individual electrodes 50 are generally placed at different intervals.

As illustrated in FIG. 1, an aluminum film 50A is formed on the surface (the surface substrate 20 side) of the respective individual electrodes 50 in order to prevent field nonuniformity which occurs between the substrates. The aluminum film 50A may be formed on, for example, the surface of the individual electrodes 50 by deposition using an aluminum alloy as a material thereof.

A signal line 54 transferring a signal to each individual electrode 50 is placed between the individual electrode 50 and the individual electrode 50. That is, the signal line 54 is placed on a boundary portion 56 between the adjacent individual electrodes 50. The respective individual electrodes 50 are insulated from each other with the signal line 54 therebetween.

The coating 60 for suppressing the reflection of light incident in the spacing member 32 through the surface substrate 20 side (see FIG. 3) onto the surface substrate 20 side is performed on the opposed surface 32A opposed to the back substrate 22 of the spacing member 32.

The coating 60 is black, and for example, carbon black as a pigment coated with polyvinyl alcohol (PVA) is used as a paint. Electric conductivity of the paint is 30 μS/cm or less in consideration of the insulating property between the adjacent individual electrodes 50. It may be effective that the opposed surface 32A is black, and a technique thereof is not limited to the coating and the opposed surface 32A may be colored with black by, for example, a method using a rib subjected to black photolithography processing or other known techniques.

An OD value of full optical transmittance of the coating 60 is 0.1 or more in order to suppress the reflection of the light on the surface substrate 20.

In the present exemplary embodiment, since an electrode surface 52 of the surface of the individual electrode 50 is configured by the aluminum film 50A as described above, the reflectivity of the individual electrode 50 is higher than that of the boundary portion 56.

(Operation of Configuration of Primary Components)

Figure 2:
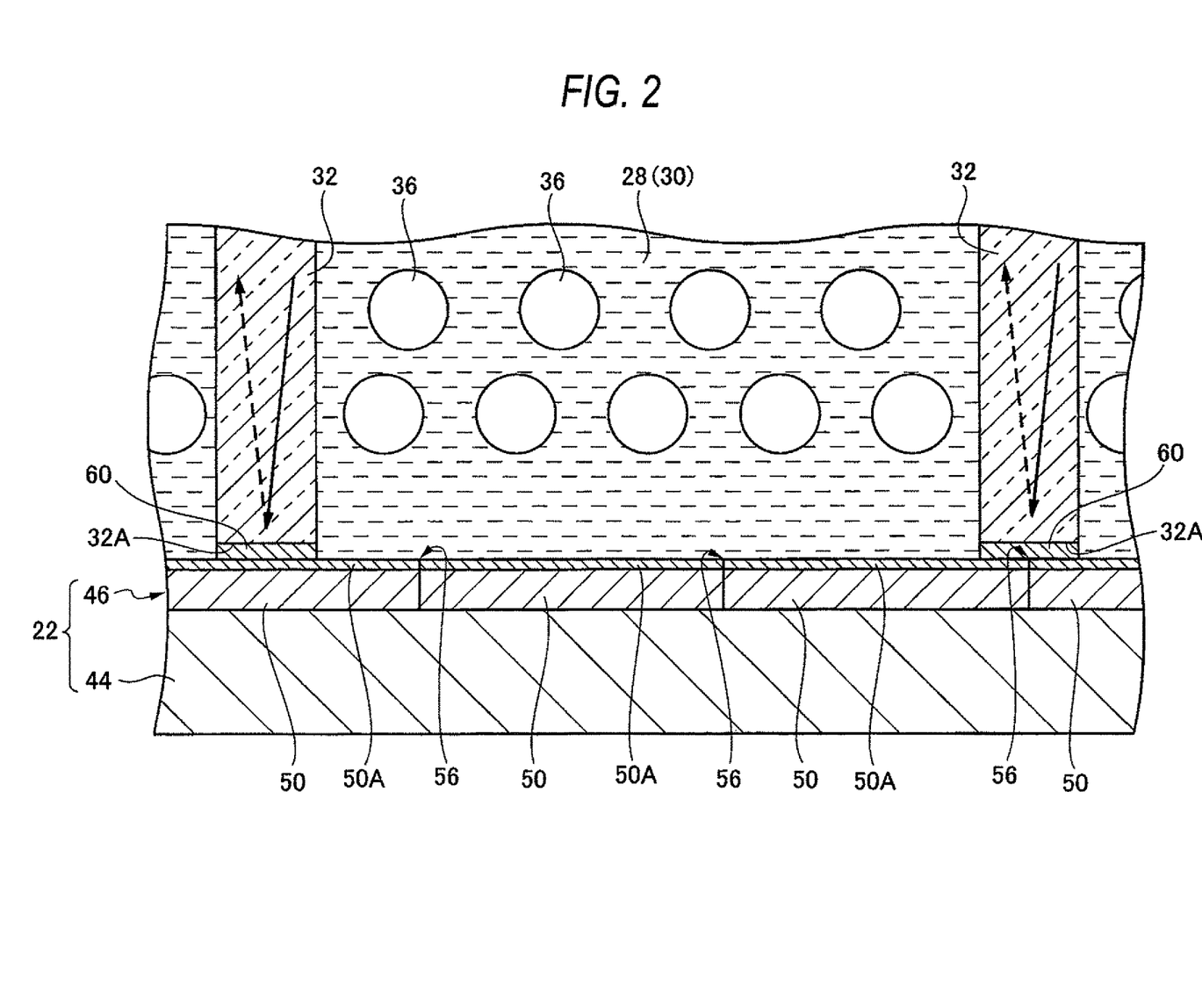
FIG. 2 is an enlarged cross-sectional view illustrating the display medium according to the first exemplary embodiment.

As illustrated in FIGS. 2 and 4, when black is displayed using the display device 10, the migratory particles 34 move from the back substrate 22 side to the surface substrate 20 side through the gaps of the reflection particles 36 by the electric field generated between the substrates, as described above.

Herein, since the spacing member 32 and the individual electrodes 50 are placed at different intervals, a state where the boundary portion 56 is opposed to the opposed surface 32A of the spacing member 32 (a right state illustrated in FIGS. 2 and 4) and a state where the boundary portion 56 is not opposed to the opposed surface 32A of the spacing member 32 (a left state illustrated in FIGS. 2 and 4), are generated.

In this case, when the coating 60 is not performed, light (see a dotted arrow in the figure) that is incident in the display medium 12 through the surface substrate 20 and the spacing member 32 and reflected toward the surface substrate 20 by the individual electrodes 50 and the boundary portion 56 is uneven by the difference between the reflectivity of the individual electrode 50 and the reflectivity of the boundary portion 56. As a result, the Moire pattern (interference pattern) is generated, such that when the Moire pattern is verified from the surface substrate 20 side with eyes, display quality deteriorates.

The coating 60 is performed on the opposed surface 32A of the spacing member 32 in the display medium 12. As a result, the reflection of the light incident in the spacing member 32 through the surface substrate 20 on the surface substrate 20 side is suppressed. As a result, the generation of the Moire pattern (interference pattern) caused by the difference between the reflectivity of the individual electrodes 50 and the reflectivity of the boundary portion 56 is suppressed.

When a white color is displayed using the display device 10, the light incident from the surface substrate 20 side is scattered colliding with the reflection particle 36 as illustrated in FIG. 3. As a result, the problem does not occur regardless of the coating 60 (see the arrow in the figure).

As compared with, for example, a case in which a chemical conversion processing is adopted, the coating 60 is performed on the opposed surface 32A of the spacing member 32 using simple.

As described above, since the coating 60 is black, the reflection is suppressed, such that the black coating 60 is assimilated (be blended) to a display color when a black color is displayed using the display device 10 as compared with a case where the coating is white. As a result, the deterioration of the display quality is suppressed.

<Second Exemplary Embodiment>

Next, examples of a display medium and a display device according to a second exemplary embodiment of the present invention will be described with reference to FIG. 8. The same reference numerals refer to the same elements as in the first exemplary embodiment and the description thereof will be omitted.

Figure 8:
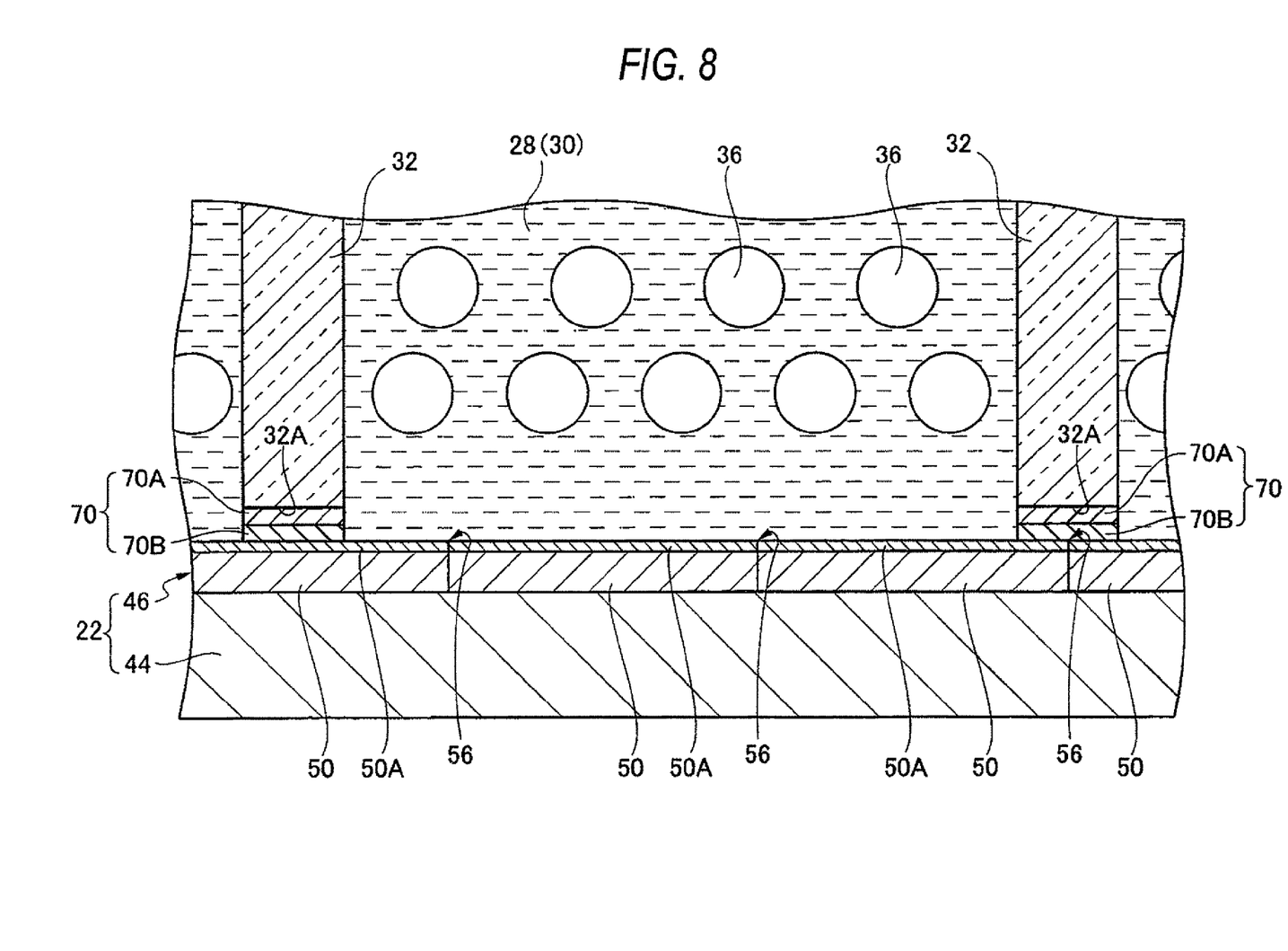
FIG. 8 is an enlarged cross-sectional view illustrating a display medium according to a second exemplary embodiment of the present invention.

As illustrated in FIG. 8, a coating 70 performed on the opposed surface 32A of the spacing member 32 includes a first coating layer 70A and a second coating layer 70B placed below the first coating layer 70A in the figure. A coating area of the first coating layer 70A and a coating area of the second coating layer 70B are equal to each other.

The first coating layer 70A and the second coating layer 70B are not configured by black but different colors, and the coating layer 70A and the second coating layer 70B are viewed with black from the viewpoint of the surface substrate 20 side by combining different colors. That is, the color of the first coating layer 70A and the color of the second coating layer 70B complement each other and configured by, for example, blue and yellow, green and red-purple (magenta), and red and greenish blue (cyan).

When the black paint is used, a particular processing may be required in order to ensure the insulating property. However, the black paint may not need to be used by combining different colors which are not black to make a black color. As a result, the insulating property between the adjacent electrodes is easily ensured. Other operations are similar to those of the first exemplary embodiment. The number of the layer of the coating 70 may be more than three as long as the coating 70 is viewed with black from the first substrate. The end portion at the second substrate side of the spacing may be formed so that the plural particles colored in different colors are viewed with black from the first substrate.

<Third Exemplary Embodiment>

Next, examples of a display medium and a display device according to a third exemplary embodiment of the present invention will be described with reference to FIG. 9. The same reference numerals refer to the same elements as in the first exemplary embodiment and the description thereof will be omitted.

Figure 9:
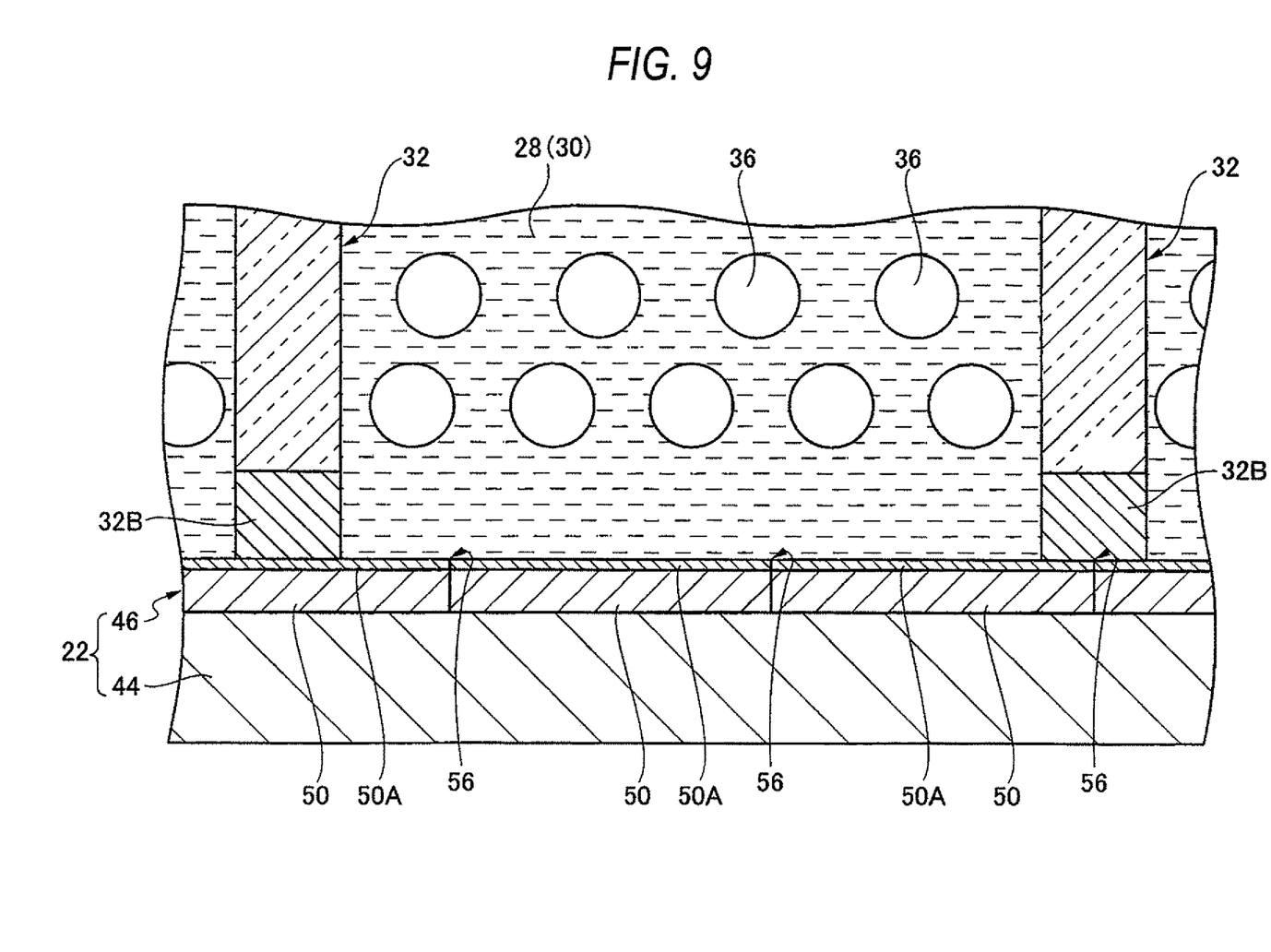
FIG. 9 is an enlarged cross-sectional view illustrating a display medium according to a third exemplary embodiment of the present invention.

As illustrated in FIG. 9, a portion of the back substrate 22 side in the spacing member 32 is not colorless and transparent, but black, and as a result, serves as a suppression portion 32B as one example of suppression processing.

A forming method of the suppression portion 32B may use, for example, a photolithography method using a dry film.

An operation is similar to that of the first exemplary embodiment.

<Fourth Exemplary Embodiment>

Next, examples of a display medium and a display device according to a fourth exemplary embodiment of the present invention will be described with reference to FIG. 10. The same reference numerals refer to the same elements as in the first exemplary embodiment and the description thereof will be omitted.

Figure 10:
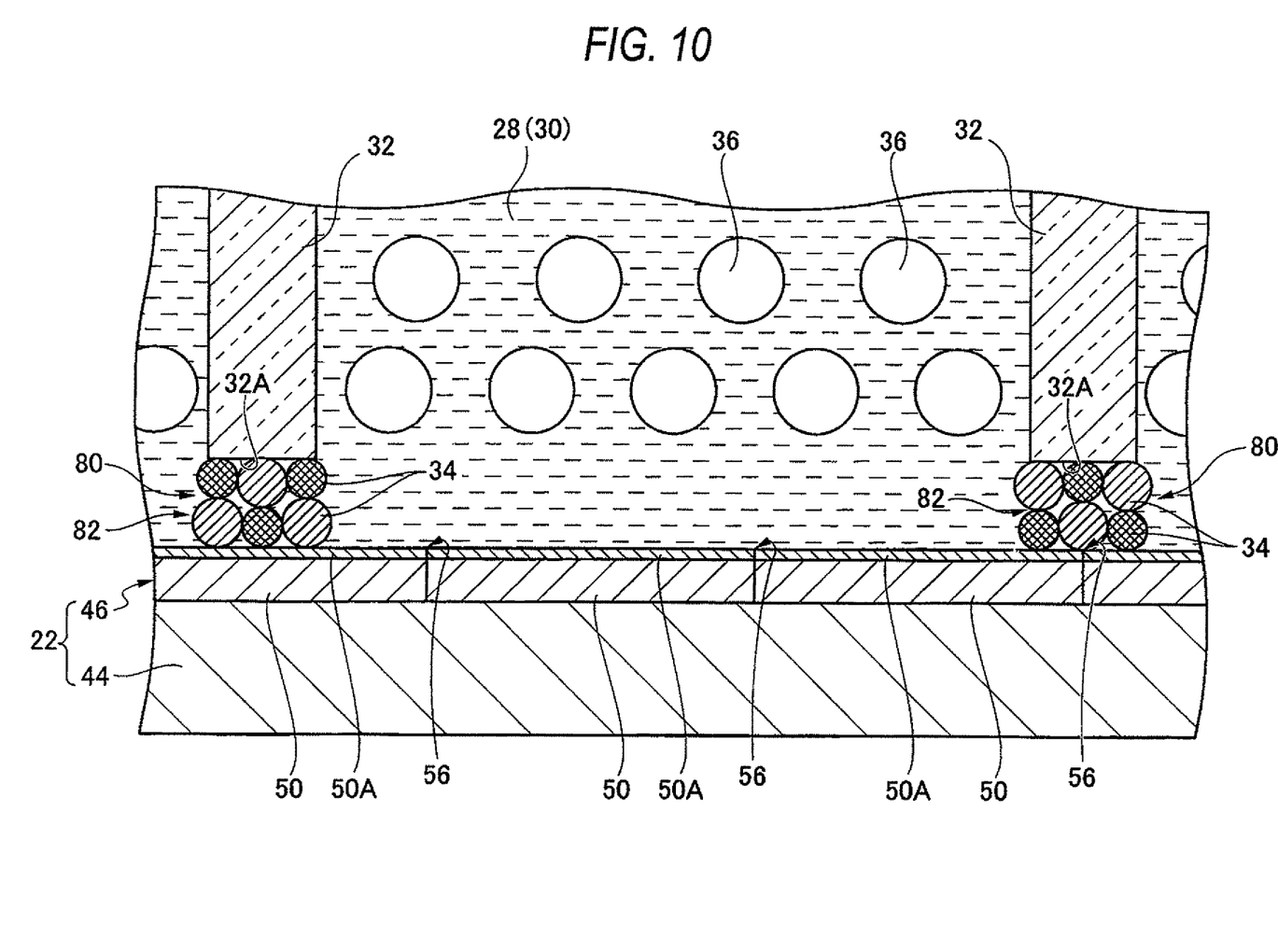
FIG. 10 is an enlarged cross-sectional view illustrating a display medium according to a fourth exemplary embodiment of the present invention.

As illustrated in FIG. 10, a gap 82 is formed between the opposed surface 32A of the spacing member 32 and the back substrate 22. Some of the migratory particles 34 which are the colored particles are inserted and kept into the gap 82, such that a repressor 80 is installed. In the present exemplary embodiment, it is known that the suppression processing is achieved by the repressor 80. The migratory particles 34 are inserted into the gap 82 when a product is shipped by repeatedly performing black and white recording with respect to the display device 10.

An operation is similar to that of the first exemplary embodiment.

Although the specific exemplary embodiments of the present invention have been described in detail, it is apparent to those skilled in the art that the present invention is not limited to the associated exemplary embodiments, but various other exemplary embodiments can be implemented within the scope of the present invention. For example, in the first exemplary embodiment, the coating 60 is performed using the black coating, but a black bonding agent may be used as the coating 60.

In the second exemplary embodiment, the coating area of the first coating layer 70A and the coating area of the second coating layer 70B are equal to each other, but only the second coating layer may be applied onto an entire surface of the back substrate 22.

In the exemplary embodiments as described above, the suppression processing is performed with respect to the entire surface of the back substrate 22 of the spacing member 32, but the suppression processing may be performed with respect to only a portion of back substrate 22 corresponding to the spacing member 32 opposed to the boundary portion 56 of the back substrate 22.

In the exemplary embodiments as described above, each parameter is described using a detailed value, but is not limited thereto and may be other values if the object of the present invention can be achieved.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display medium, comprising:
a first substrate that is transparent to light;
a second substrate that is provided to be opposite to the first substrate and that has a plurality of electrodes placed at a predetermined interval;
a spacing member (i) that is placed between the first and second substrates at another interval different from the predetermined interval of the electrodes, (ii) that has a first end portion on a first substrate side of the spacing member and a second end portion on a second substrate side of the spacing member,
wherein the first end portion is transparent to light,
wherein the second end portion has different transparency from the first end portion to reduces a reflection of light incident through the first substrate onto a first substrate side of the spacing member; and
a particle dispersion liquid that is filled between the first and second substrates, and that includes particles which are moved by an electric field formed between the first and second substrates and a dispersion medium.

2. The display medium of claim 1,
wherein the second end portion is a coating layer that covers a surface of the spacing member.

3. The display medium of claim 2,
wherein the coating layer is colored with black.

4. The display medium of claim 2,
wherein the second end portion contains a black bonding agent which bonds the spacing member and the second substrate to each other.

5. The display medium of claim 1,
wherein the second end portion is constituted by a plurality of subjects so that the plurality of subjects are combined to be black from a viewpoint of the first substrate side.

6. The display medium of claim 1,
wherein the particles are colored,
the second end portion contains some of the particles.

7. A display device, comprising:
the display medium of claim 1; and
a field forming unit that is configured to form an electric field between the first and second substrates by applying voltage between the first and second substrates provided in the display medium.

8. A display medium, comprising:
a first substrate that is transparent to light;
a second substrate that is provided to be opposite to the first substrate and that has a plurality of electrodes placed at a predetermined interval;
a spacing member made of a resin, which is placed between the first and second substrates at another interval different from the predetermined interval of the electrodes and that has an opposed surface which faces to the second substrate,
wherein a coating layer is formed on the opposed surface; and
a particle dispersion liquid containing particles and a dispersion medium, wherein the particles are moved by an electric field formed between the first and second substrates and the dispersion medium, and wherein the particle dispersion liquid is filled between the first and second substrates.

9. The display medium of claim 8, wherein the coating layer is a black layer.

* * * * *